United States Patent
O'Malley et al.

(10) Patent No.: US 8,111,820 B2
(45) Date of Patent: *Feb. 7, 2012

(54) AUDIO CONFERENCE PLATFORM WITH DYNAMIC SPEECH DETECTION THRESHOLD

(75) Inventors: William O'Malley, Georgetown, MA (US); Charles M. Grandgent, Maynard, MA (US)

(73) Assignee: Polycom, Inc., Pleasanton, CA (US)

( * ) Notice: Subject to any disclaimer, the term of this patent is extended or adjusted under 35 U.S.C. 154(b) by 2310 days.

This patent is subject to a terminal disclaimer.

(21) Appl. No.: 10/801,276

(22) Filed: Mar. 16, 2004

(65) Prior Publication Data

US 2004/0174973 A1 Sep. 9, 2004

Related U.S. Application Data

(63) Continuation of application No. 10/135,323, filed on Apr. 30, 2002, now Pat. No. 6,721,411.

(60) Provisional application No. 60/287,441, filed on Apr. 30, 2001.

(51) Int. Cl.
*H04L 12/16* (2006.01)

(52) U.S. Cl. .............. 379/202.01; 379/201.01

(58) Field of Classification Search ............ 379/202.01, 379/201.01, 203.01, 204.01, 205.01, 206.01, 379/207.01, 157, 158, 388.06, 388.07, 390.01; 370/263

See application file for complete search history.

(56) References Cited

U.S. PATENT DOCUMENTS

| | | | | |
|---|---|---|---|---|
| 5,495,522 A | * | 2/1996 | Allen et al. | 379/202.01 |
| 5,548,638 A | | 8/1996 | Yamaguchi et al. | 379/202.01 |
| 5,768,263 A | * | 6/1998 | Tischler et al. | 370/263 |
| 5,841,763 A | * | 11/1998 | Leondires et al. | 370/260 |
| 5,889,851 A | * | 3/1999 | Hsieh | 379/351 |
| 5,983,183 A | * | 11/1999 | Tabet et al. | 704/270 |
| 5,991,277 A | * | 11/1999 | Maeng et al. | 370/263 |
| 6,154,721 A | * | 11/2000 | Sonnic | 704/233 |
| 6,259,691 B1 | | 7/2001 | Nuadus | 370/352 |
| 6,480,823 B1 | * | 11/2002 | Zhao et al. | 704/226 |
| 6,490,554 B2 | * | 12/2002 | Endo et al. | 704/215 |
| 6,718,302 B1 | * | 4/2004 | Wu et al. | 704/233 |
| 7,428,223 B2 | * | 9/2008 | Nierhaus et al. | 370/260 |
| 7,433,462 B2 | * | 10/2008 | Hodges et al. | 379/388.06 |
| 2004/0181402 A1 | * | 9/2004 | Bartkowiak | 704/226 |

FOREIGN PATENT DOCUMENTS

| | | |
|---|---|---|
| GB | 2162719 | 2/1986 |
| WO | WO 00/57620 | 9/2000 |

* cited by examiner

*Primary Examiner* — William Deane, Jr.
(74) *Attorney, Agent, or Firm* — Wong, Cabello, Lutsch, Rutherford & Brucculeri, LLP

(57) ABSTRACT

The present invention comprises a method for audio/video conferencing. In a preferred embodiment, the method comprises using a dynamic threshold value to determine whether there is speech on a line. One aspect, the method comprises determining a dynamic threshold value based on one or more characteristics of signals received on a port, associating that dynamic threshold value with the port; and comparing one or more characteristics of signals subsequently received on the port to the dynamic threshold value. Signals received over a plurality of ports are summed, but for ports whose signal characteristics have a specified relationship to the dynamic threshold value associated with that port, signals are not contained in the sum.

15 Claims, 9 Drawing Sheets

AUDIO CONFERENCE PLATFORM WITH DYNAMIC SPEECH DETECTION THRESHOLD

CROSS-REFERENCE TO RELATED APPLICATIONS

This application is a continuation application of U.S. patent application Ser. No. 10/135,323, filed Apr. 30, 2002, now U.S. Pat. No. 6,721,411, which is a non-provisional filing of U.S. Provisional Application Ser. No. 60/287,441, filed Apr. 30, 2001. Priority is claimed to both of these applications, and both are incorporated herein by reference.

BACKGROUND OF THE INVENTION

The present invention relates to telephony, and in particular to an audio conferencing platform.

Audio conferencing platforms are known. For example, see U.S. Pat. Nos. 5,483,588 and 5,495,522. Audio conferencing platforms allow conference participants to easily schedule and conduct audio conferences with a large number of users. In addition, audio conference platforms are generally capable of simultaneously supporting many conferences.

A problem with existing audio conference platforms is that they employ a fixed threshold to determine whether a conference participant is speaking. Using such a fixed threshold may result in a conference participant being added to the summed conference audio, even though they are not speaking. Specifically, if the background audio noise is high (e.g., the user is on a factory floor), then the amount of digitized audio energy associated with that conference participant may be sufficient for the conference platform to falsely detect speech, and add the background noise to the conference sum under the mistaken belief that the energy is associated with speech.

Therefore, there is a need for a system that accounts for background noise in the detection of valid conference speakers.

SUMMARY OF THE INVENTION

One object of the present invention is to provide a method and system that advantageously accounts for background noise on lines participating in a conference call and prevents the background noise from being added to the conference sum because an erroneous determination has been made that the energy is associated with speech. Another object is to provide such an advantage dynamically, to account for changing conditions on participating lines.

A preferred embodiment of the invention comprises an audio conferencing platform that includes a time division multiplexing (TDM) data bus, a controller, and an interface circuit that receives audio signals from a plurality of conference participants and provides digitized audio signals in assigned time slots over the data bus. The audio conferencing platform also includes a plurality of digital signal processors (DSPs) adapted to communicate on the TDM bus with the interface circuit. At least one of the DSPs sums a plurality of the digitized audio signals associated with conference participants who are speaking to provide a summed conference signal. This DSP provides the summed conference signal to at least one of the other plurality of DSPs, which removes the digitized audio signal associated with a speaker whose voice is included in the summed conference signal, thus providing a customized conference audio signal to each of the speakers.

Each of the digitized audio signals are processed to determine whether the digitized audio signal includes speech. For each digitized audio signal, the amount of energy associated with the digitized audio signal is compared against a dynamic threshold value associated with the line over which the audio signal is received. The dynamic threshold value is set as a function of background noise within the digitized audio signal.

The audio conferencing platform preferably configures at least one of the DSPs as a centralized audio mixer and at least another one of the DSPs as an audio processor. The centralized audio mixer performs the step of summing a plurality of the digitized audio signals associated with conference participants who are speaking, to provide the summed conference signal. The centralized audio mixer provides the summed conference signal to the audio processor(s) for post processing and routing to the conference participants. The post processing includes removing the audio associated with a speaker from the conference signal to be sent to the speaker. For example, if there are forty conference participants and three of the participants are speaking, then the summed conference signal will include the audio from the three speakers. The summed conference signal is made available on the data bus to the thirty-seven non-speaking conference participants. However, the three speakers each receive an audio signal that is equal to the summed conference signal less the digitized audio signal associated with that speaker. Removing the speaker's own voice from the audio he hears reduces echoes.

The centralized audio mixer also preferably receives DTMF detect bits indicative of the digitized audio signals that include a DTMF tone. The DTMF detect bits may be provided by another of the DSPs that is programmed to detect DTMF tones. If the digitized audio signal is associated with a speaker, but the digitized audio signal includes a DTMF tone, the centralized conference mixer will not include the digitized audio signal in the summed conference signal while that DTMF detect bit signal is active. This ensures that conference participants do not hear annoying DTMF tones in the conference audio. When the DTMF tone is no longer present in the digitized audio signal, the centralized conference mixer may include the audio signal in the summed conference signal.

The audio conference platform is preferably capable of supporting a number of simultaneous conferences (e.g., 384). As a result, the audio conference mixer provides a summed conference signal for each of the conferences.

Each of the digitized audio signals may be preprocessed. The preprocessing steps include decompressing the signal (e.g., using the well-known µ-law or A-law compression schemes), and determining whether the magnitude of the decompressed audio signal is greater than a detection threshold. If it is, then a speech bit associated with the digitized audio signal is set. Otherwise, the speech bit is cleared.

The centralized conference mixer reduces repetitive tasks distributed between the plurality of DSPs. In addition, centralized conference mixing provides a system architecture that is scalable and thus easily expanded.

Advantageously, using a dynamic threshold value to determine whether there is speech on a line helps to ensure that background noise is not falsely detected as speech.

Thus, a method in accordance with a preferred embodiment of the present invention comprises receiving audio signals over a plurality of ports. For at least one port, the method comprises determining a dynamic threshold value based on one or more characteristics of signals received on the port; associating said dynamic threshold value with the port; and comparing one or more characteristics of signals subsequently received on the port to the dynamic threshold value.

The method further comprises summing signals received over the plurality of ports, wherein signals received on the at least one port whose characteristics (such as energy level) have a specified relationship to the dynamic threshold value (for example, having an energy level less than the threshold value) are not contained in the sum. The method may further comprise preprocessing audio signals by decompressing them using either μ-law or A-law decompression.

In one aspect, the method comprises identifying which ports are receiving audio signals that contain speech; and, on each such identified port, transmitting a summed signal, wherein said summed signal does not contain signals received on that port.

In another aspect, the method comprises identifying which ports are receiving audio signals that contain DTMF tones; and, on each such identified port, transmitting a summed signal, wherein said summed signal does not contain signals received on that port. Preferably, the step of identifying comprises setting a DTMF detect bit for a signal. The method may also comprise the step of including signals from previously identified ports in the sum after those ports are no longer identified as receiving signals containing one or more DTMF tones.

The invention further comprises software and systems for implementing methods described herein.

These and other objects, features, and advantages of the present invention will become apparent in light of the following detailed description of preferred embodiments thereof, as illustrated in the accompanying drawings.

Although the invention has been described in connection with an audio conferencing platform, it is not limited to such a platform and may be used, for example, in a video conferencing system.

DETAILED DESCRIPTION OF THE INVENTION

Figure 1:
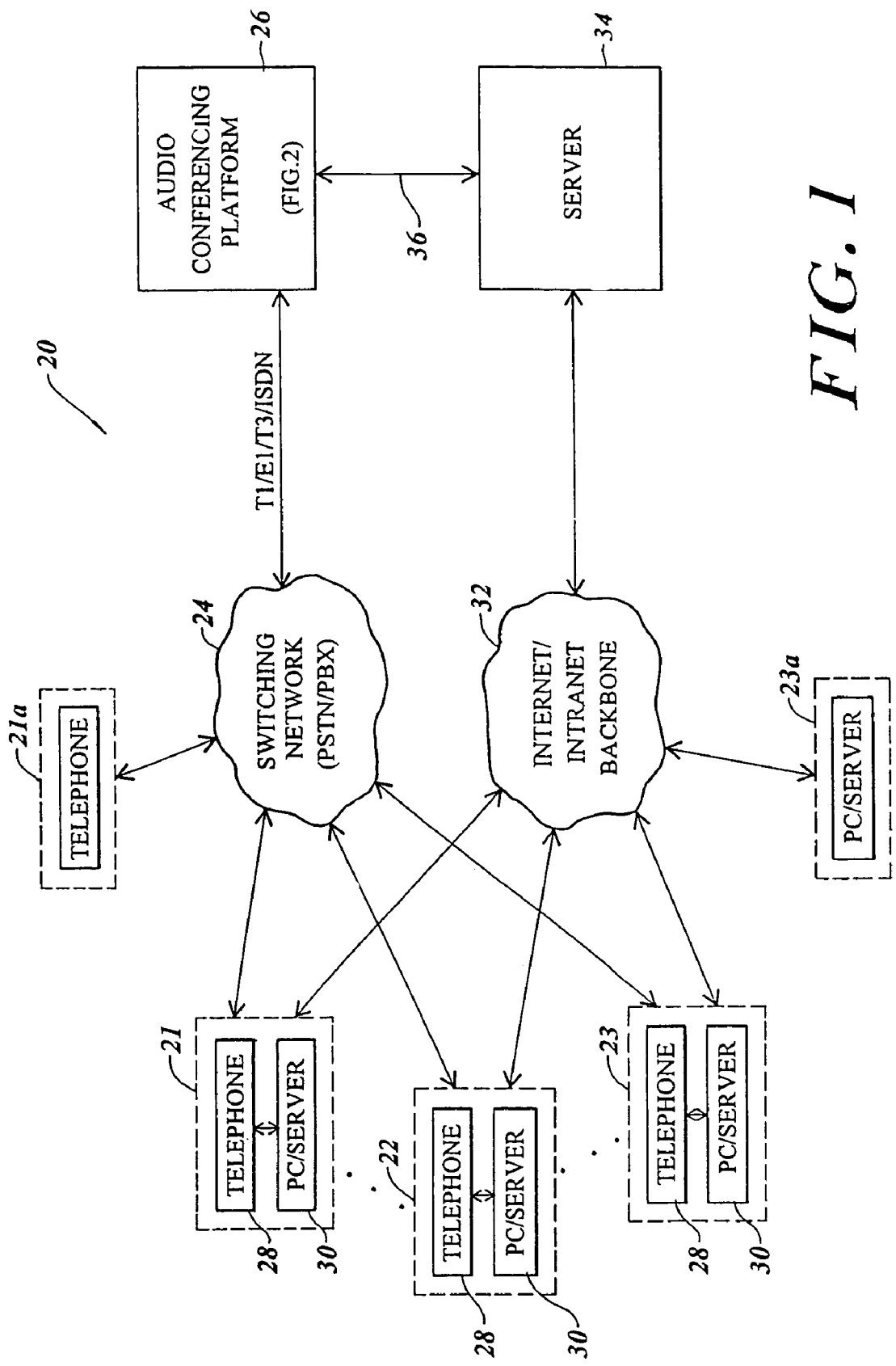
FIG. 1 illustrates a conferencing system in accordance with a preferred embodiment of the present invention.

FIG. 1 is a diagram of a conferencing system 20 in accordance with a preferred embodiment of the present invention. The system 20 connects a plurality of user sites 21-23 through a switching network 24 to an audio conferencing platform 26. The plurality of user sites may be distributed worldwide, or at a company facility/campus. For example, each of the user sites 21-23 may be in different cities and connected to the audio platform 26 via the switching network 24, which may include PSTN and PBX systems. The connections between the user sites and the switching network 24 may include T1, E1, T3, and ISDN lines.

Each user site 21-23 preferably includes one or more telephones 28 and one or more personal computers or servers 30. However, a user site may only include either a telephone, such as user site 21a, or a computer/server, such as user site 23a. The computer/server 30 may be connected via an Internet/intranet backbone 32 to a server 34. The audio conferencing platform 26 and the server 34 are connected via a data link 36 (e.g., a 10/100Base T Ethernet link). The computer 30 allows the user to participate in a data conference simultaneous to the audio conference via the server 34. In addition, the user can use the computer 30 to interface (e.g., via a browser) with the server 34 to perform functions such as conference control, administration (e.g., system configuration, billing, reports, . . . ), scheduling and account maintenance. The telephone 28 and the computer 30 may cooperate to provide voice over the Internet/intranet 32 to the audio conferencing platform 26 via the data link 36.

Figure 2:
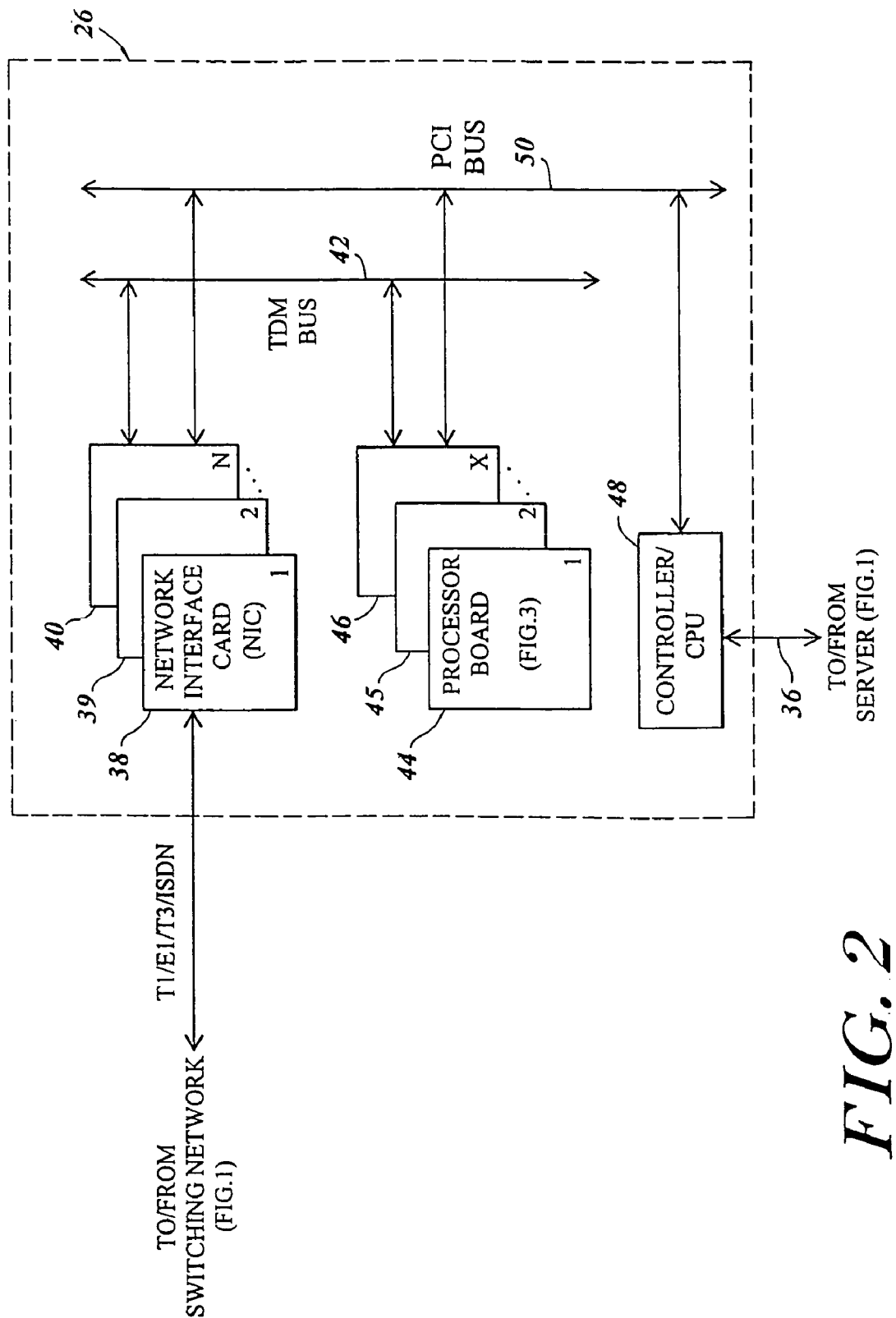
FIG. 2 illustrates a functional block diagram of an audio conferencing platform of a preferred embodiment within the conferencing system of FIG. 1.

FIG. 2 is a functional block diagram of an audio conferencing platform 26 in accordance with a preferred embodiment of the present invention. The audio conferencing platform 26 includes a plurality of network interface cards (NICs) 38-40 that receive audio information from the switching network 24 (see FIG. 1). Each NIC is preferably capable of handling a plurality of different trunk lines (e.g., eight). The data received by the NIC is generally an 8-bit μ-law or A-law sample. The NIC places the sample into a memory device (not shown), which is used to output the audio data onto a data bus. The data bus is preferably a TDM bus based, in one embodiment, upon the H.110 telephony standard.

The audio conferencing platform 26 also includes a plurality of processor boards 44-46 that receive and transmit data to the NICs 38-40 over the TDM bus 42. The NICs and the processor boards 44-46 also communicate with a controller/CPU board 48 over a system bus 50. The system bus 50 is preferably based upon the Compact Peripheral Component Interconnect ("cPCI") standard. The CPU/controller communicates with the server 34 (see FIG. 1) via the data link 36. The controller/CPU board may include a general purpose processor such as a 200 MHz Pentium™ CPU manufactured by Intel Corporation, a processor from AMD or any other similar processor (including an ASIC) having sufficient processor speed (MIPS) to support the present invention.

Figure 3:
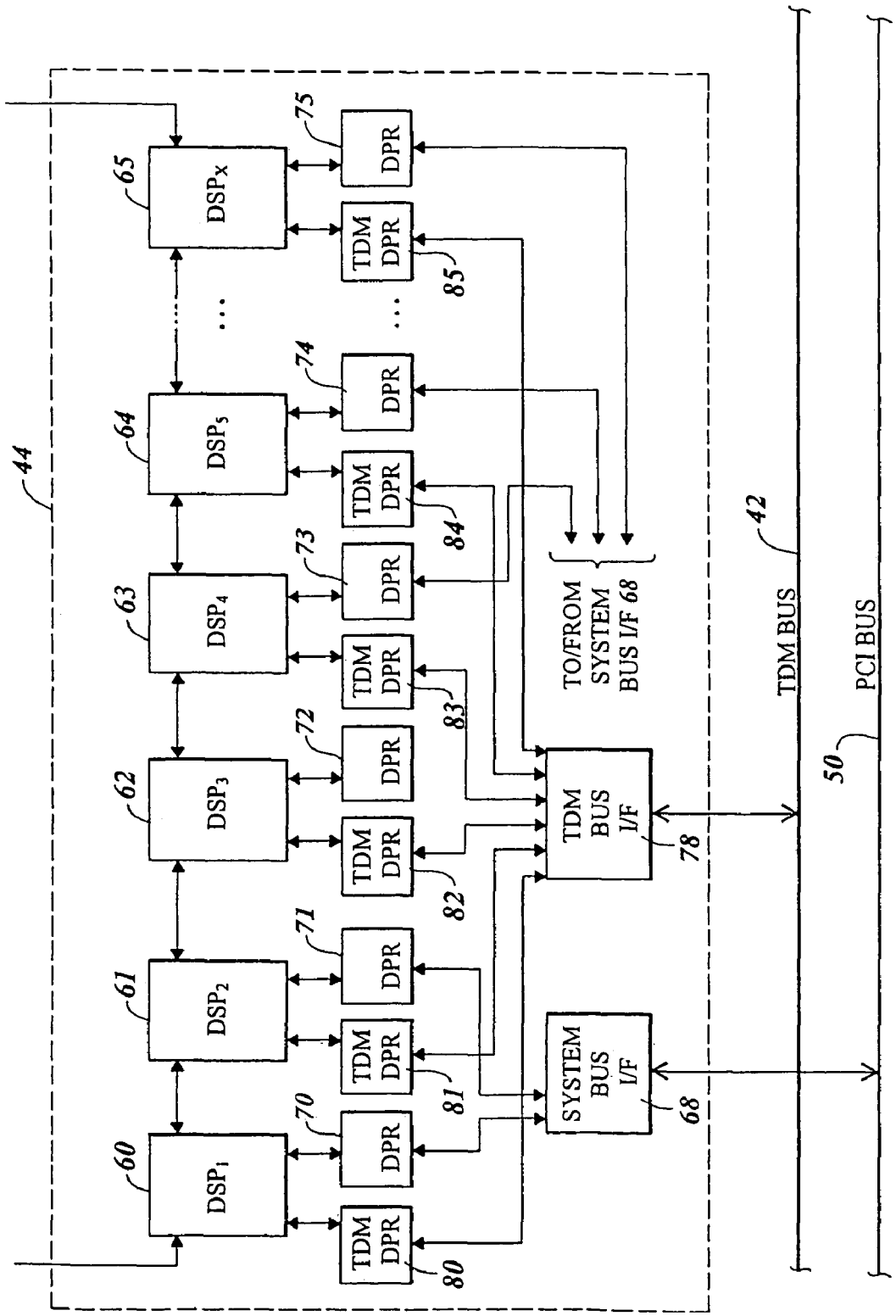
FIG. 3 is a block diagram illustration of a processor board of a preferred embodiment within the audio conferencing platform of FIG. 2.

FIG. 3 is block diagram illustration of the processor board 44. The board 44 includes a plurality of dynamically programmable digital signal processors 60-65. Each digital signal processor (DSP) is an integrated circuit that communicates with the controller/CPU card 48 (see FIG. 2) over the system bus 50. Specifically, the processor board 44 includes a bus interface 68 that interconnects the DSPs 60-65 to the system bus 50. Each DSP also includes an associated dual port RAM (DPR) 70-75 that buffers commands and data for transmission between the system bus 50 and the associated DSP.

Each DSP 60-65 also transmits data over and receives data from the TDM bus 42. The processor card 44 includes a TDM bus interface 78 that performs any necessary signal conditioning and transformation. For example, if the TDM bus is an H.110 bus, it includes thirty-two serial lines. As a result the TDM bus interface may include a serial-to-parallel and a parallel-to-serial interface.

Each DSP 60-65 also includes an associated TDM dual port RAM 80-85 that buffers data for transmission between the TDM bus 42 and the associated DSP.

Each of the DSPs is preferably a general purpose digital signal processor IC, such as the model number TMS320C6201 processor available from Texas Instruments. The number of DSPs resident on the processor board 44 is a function of the size of the integrated circuits, their power consumption, and the heat dissipation ability of the processor board. For example, in certain embodiments there may be between four and ten DSPs per processor board.

Executable software applications may be downloaded from the controller/CPU 48 (see FIG. 2) via the system bus 50 to a selected one(s) of the DSPs 60-65. Each of the DSPs is preferably also connected to an adjacent DSP via a serial data link.

Figure 4:
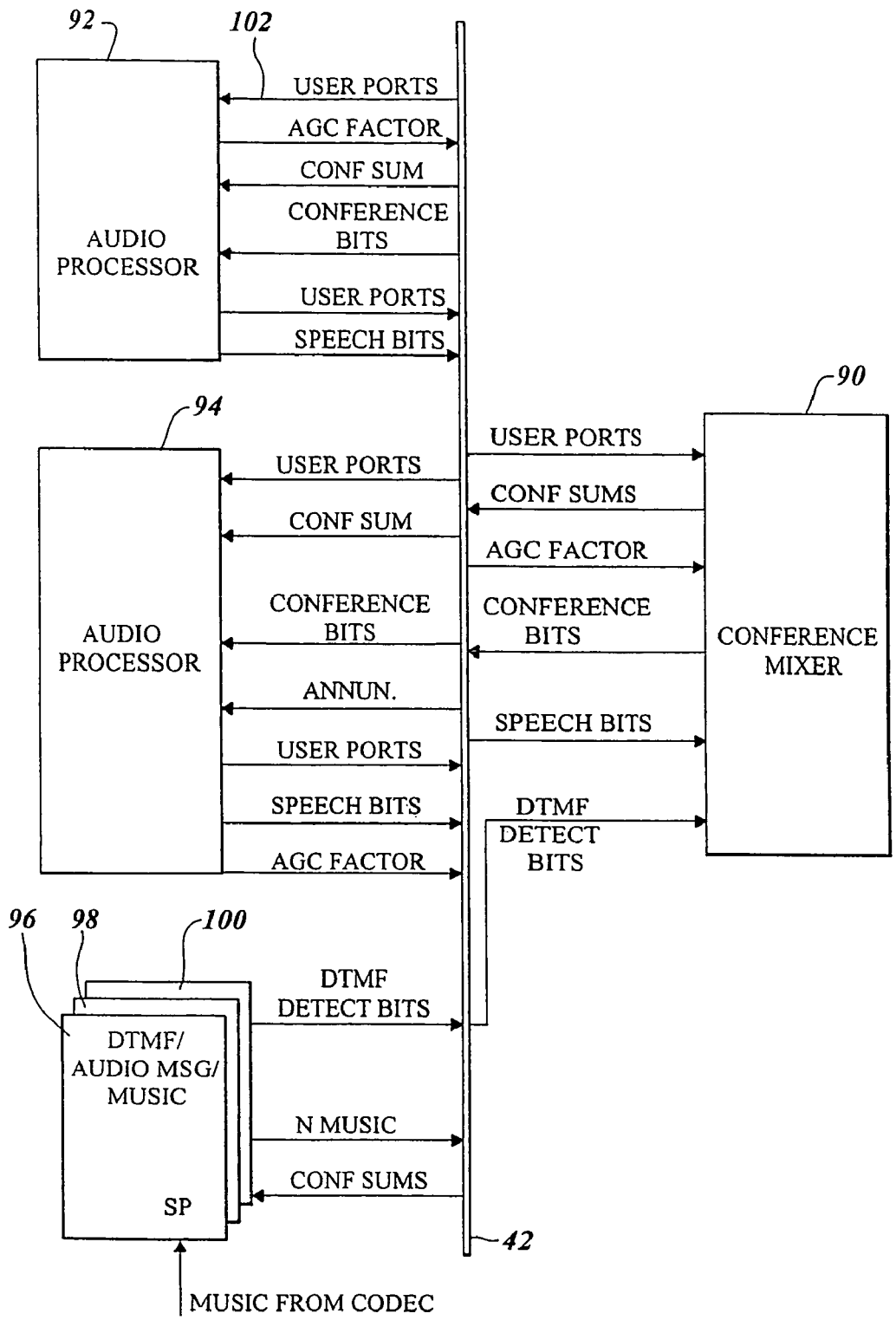
FIG. 4 is a functional block diagram illustration of resources on the processor board of FIG. 3.

FIG. 4 is illustrates the DSP resources on the processor board 44 illustrated in FIG. 3. Referring to FIGS. 3 and 4, the controller/CPU 48 (see FIG. 2) downloads executable program instructions to a DSP based upon the function that the controller/CPU assigns to the DSP. For example, the controller/CPU may download executable program instructions for the DSP3 62 to function as an audio conference mixer 90, while the DSP2 61 and the DSP4 63 may be configured as audio processors 92, 94, respectively. Other DSPs 60, 65 may be configured by the controller/CPU 48 (see FIG. 2) to provide services such as DTMF detection 96, audio message generation 98 and music playback 100.

Each audio processor 92, 94 is capable of supporting a certain number of user ports (i.e., conference participants). This number is based upon the operational speed of the various components within the processor board and the over-all design of the system. Each audio processor 92, 94 receives compressed audio data 102 from the conference participants over the TDM bus 42.

The TDM bus 42 may, for example, support 4096 time slots, each having a bandwidth of 64 kbps. The timeslots are generally dynamically assigned by the controller/CPU 48 (see FIG. 2) as needed for the conferences that are currently occurring. However, one of ordinary skill in the art will recognize that in a static system the timeslots may be predetermined.

Figure 5:
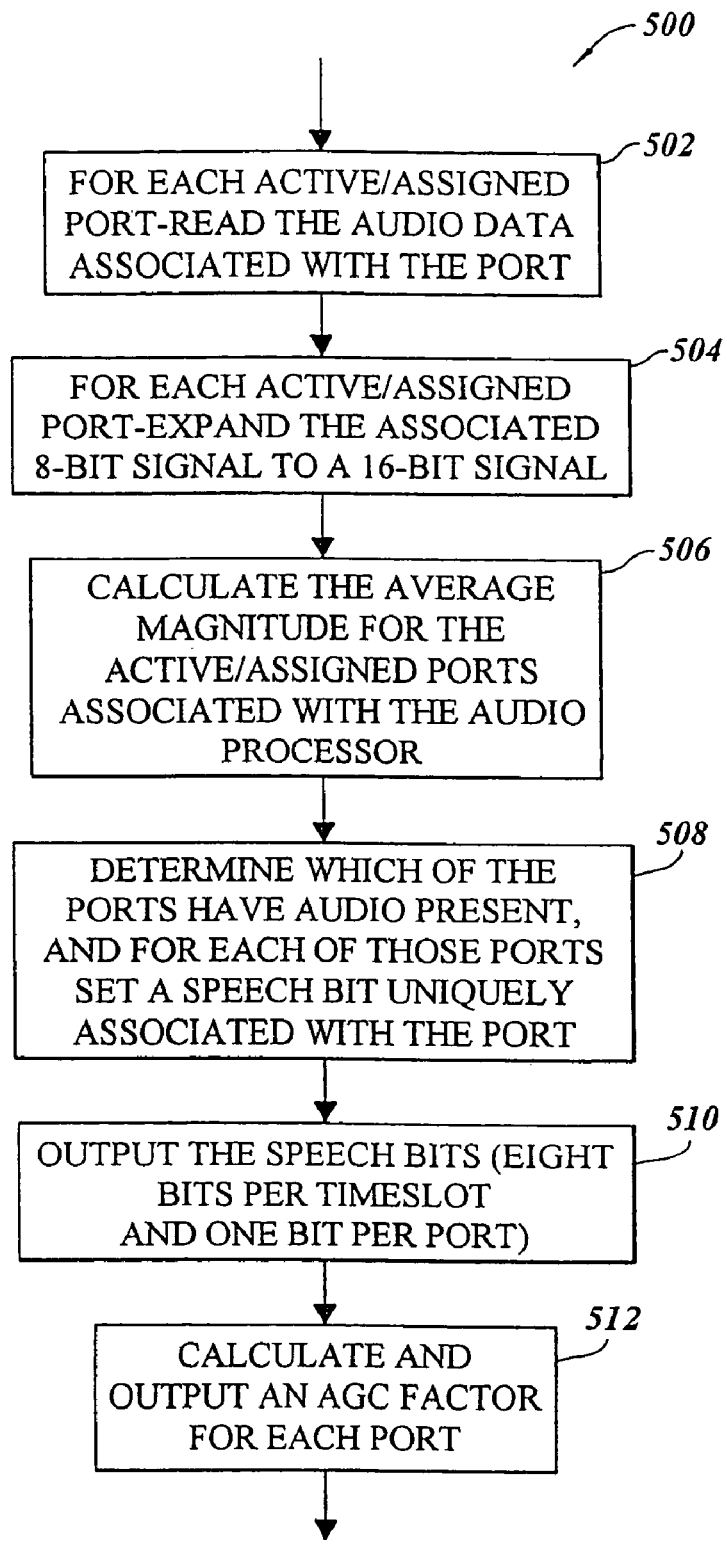
FIG. 5 is a flow chart illustrating the processing of signals received from network interface cards over a TDM bus.

FIG. 5 is a flow chart illustrating the processing steps 500 performed by each audio processor on the digitized audio signals received over the TDM bus 42 from the NICs 38-40 (see FIG. 2). The executable program instructions associated with these processing steps 500 are typically downloaded to the audio processors 92, 94 (see FIG. 4) by the controller/CPU 48 (see FIG. 2). The download may occur during system initialization or reconfiguration. These processing steps 500 preferably are executed at least once every 125 microseconds to provide audio of the requisite quality.

For each of the active/assigned ports for the audio processor, step 502 reads the audio data for that port from TDM dual port RAM associated with the audio processor. For example, if DSP2 61 (see FIG. 3) is configured to perform the function of audio processor 92 (see FIG. 4), then the data is read from the read bank of the TDM dual port RAM 81. If the audio processor 92 is responsible for, for example, 700 active/assigned ports, then step 502 reads the 700 bytes of associated audio data from the TDM dual port RAM 81. Each audio processor includes a time slot allocation table (not shown) that specifies the address location in the TDM dual port RAM for the audio data from each port.

Since each of the audio signals is typically compressed (e.g., μ-law, A-law), step 504 decompresses each of the 8-bit signals to a 16-bit word. Step 506 computes the average magnitude (AVM) for each of the decompressed signals associated with the ports assigned to the audio processor. For additional details, see co-pending U.S. patent application Ser. No. 09/532,602, filed Mar. 22, 2000, entitled "Scalable Audio Conference Platform," the entire contents of which are incorporated herein by reference for all purposes.

Step 508 is performed to determine which of the ports are speaking. This step compares the average magnitude for the port computed in step 506 against a predetermined magnitude value representative of speech (e.g., −35 dBm). If average magnitude for the port exceeds the predetermined magnitude value representative of speech, a speech bit associated with the port is set. Otherwise, the associated speech bit is cleared. Each port has an associated speech bit. Step 510 outputs all the speech bits (eight per timeslot) onto the TDM bus. Step 512 is performed to calculate an automatic gain correction (AGC) value for each port. To compute an AGC value for the port, the AVM value is converted to an index value associated with a table containing gain/attenuation factors. For example, there may be 256 index values, each uniquely associated with 256 gain/attenuation factors. The index value is used by the conference mixer 90 (see FIG. 4) to determine the gain/attenuation factor to be applied to an audio signal that will be summed to create the conference sum signal.

In a preferred embodiment, the threshold used in step 508 to determine whether speech is present is a dynamic speech detection threshold value, set as a function of the noise detected on the line. For example, if the magnitude for the energy for the line/port exceeds a noise detection threshold value for a predetermined amount of time (e.g., three seconds), then noise is detected and a higher threshold value may be used in step 510 to determine whether the user is speaking. Once noise has been detected, the dynamic threshold value may be set as a function of the magnitude (e.g., audio signal magnitude) of the energy (e.g., audio signal energy) on the line. For example, the dynamic threshold value may be set to a certain value greater than the value of the noise on the line (e.g., the average noise). Each line may employ a different speech detection threshold, since the background noise, and hence noise threshold, on each of the lines may be different.

The system may also set a noise bit for the line, and the noise bit may be provided to the controller/CPU 48 (see FIG. 2) to take the necessary action due to the background noise. The action may include not allowing this conference participant to be on the speech list (i.e., the list of lines summed to create the conference signal), or sending an audio message to the conference participant that the system detects high background noise and recommends that the conference participant try to take corrective action (e.g., move to a different area, close an office door, go off speaker phone, etc.).

Additional action may include sending an audio message to the conference participant that the system detects high background noise and instructing the participant to hit a key on the telephone keypad so the system does not consider the audio from the participant for the conference audio. The system would then detect the DTMF tone associated with the key being depressed and take the necessary action to prevent audio from this participant from being used in the conference sum, until such time that the user, for example, hits the same key again or another key instructing the system to consider audio from the participant for the conference sum.

Figure 6:
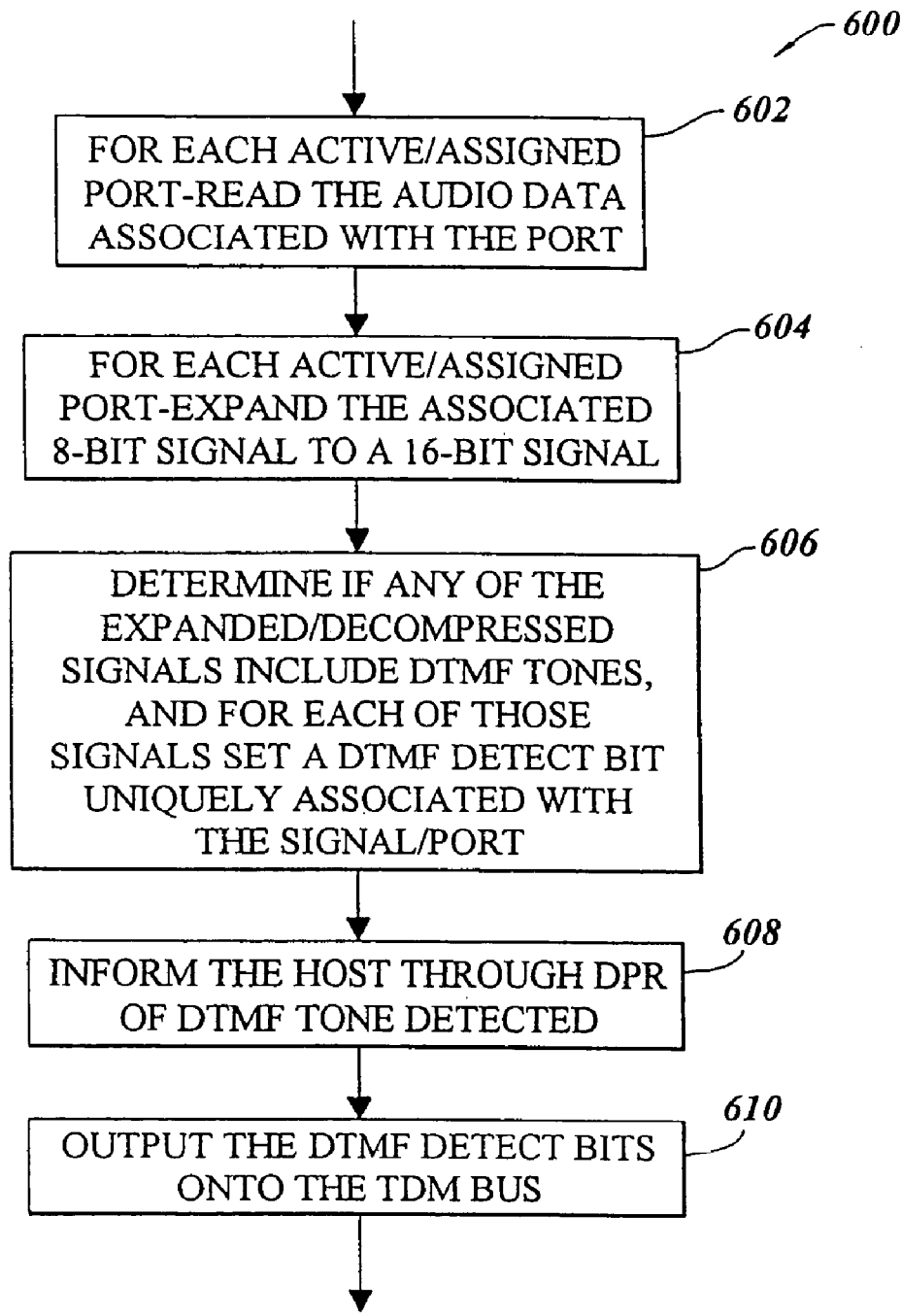
FIG. 6 is a flow chart illustration of the DTMF tone detection processing.

FIG. 6 is a flow chart illustration of the DTMF tone detection processing 600. These processing steps 600 are performed by the DTMF processor 96 (see FIG. 4), preferably at least once every 125 microseconds, to detect DTMF tones within digitized audio signals from the NICs 38-40 (FIG. 2). One or more of the DSPs may be configured to operate as a DTMF tone detector. The executable program instructions associated with the processing steps 600 are typically downloaded by the controller/CPU 48 (see FIG. 2) to the DSP designated to perform the DTMF tone detection function. The download may occur during initialization or system reconfiguration.

For an assigned number of the active/assigned ports of the conferencing system, step 602 reads the audio data for the port from the TDM dual port RAM associated with the DSP(s) configured to perform the DTMF tone detection function. Step 604 then expands the 8-bit signal to a 16-bit word. Next, step 606 tests each of these decompressed audio signals to determine whether any of the signals includes a DTMF tone. For any signal that does include a DTMF tone, step 606 sets a DTMF detect bit associated with the port. Otherwise, the DTMF detect bit is cleared. Each port has an associated DTMF detect bit. Step 608 informs the controller/CPU 48 (see FIG. 3) through Dual Port Ram (DPR) which DTMF tone was detected, since the tone is representative of system commands and/or data from a conference participant. Step 610 outputs the DTMF detect bits onto the TDM bus.

Figure 7A:
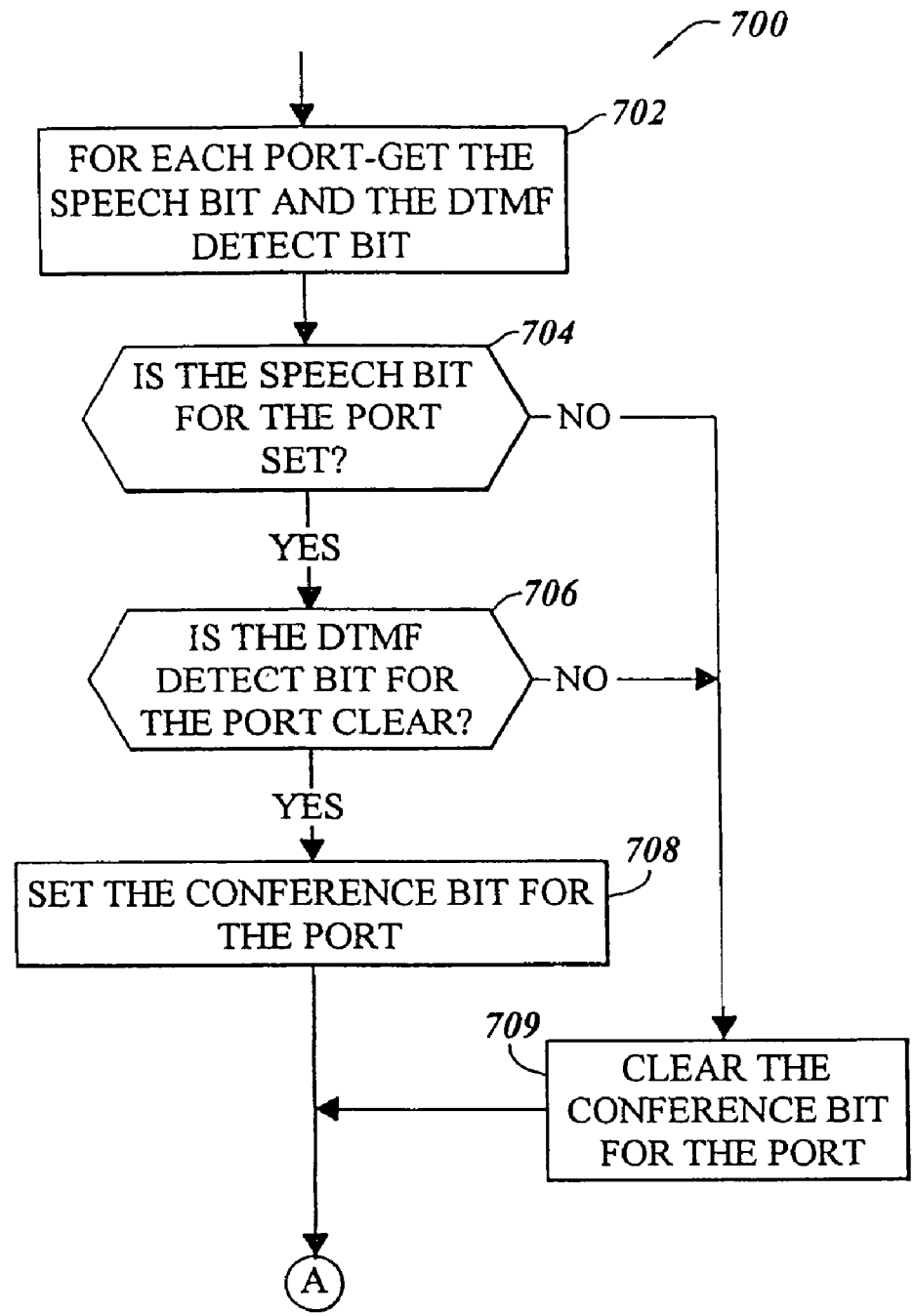
FIGS. 7A-7B together provide a flow chart illustration of preferred conference mixer processing to create a summed conference signal.
Figure 7B:
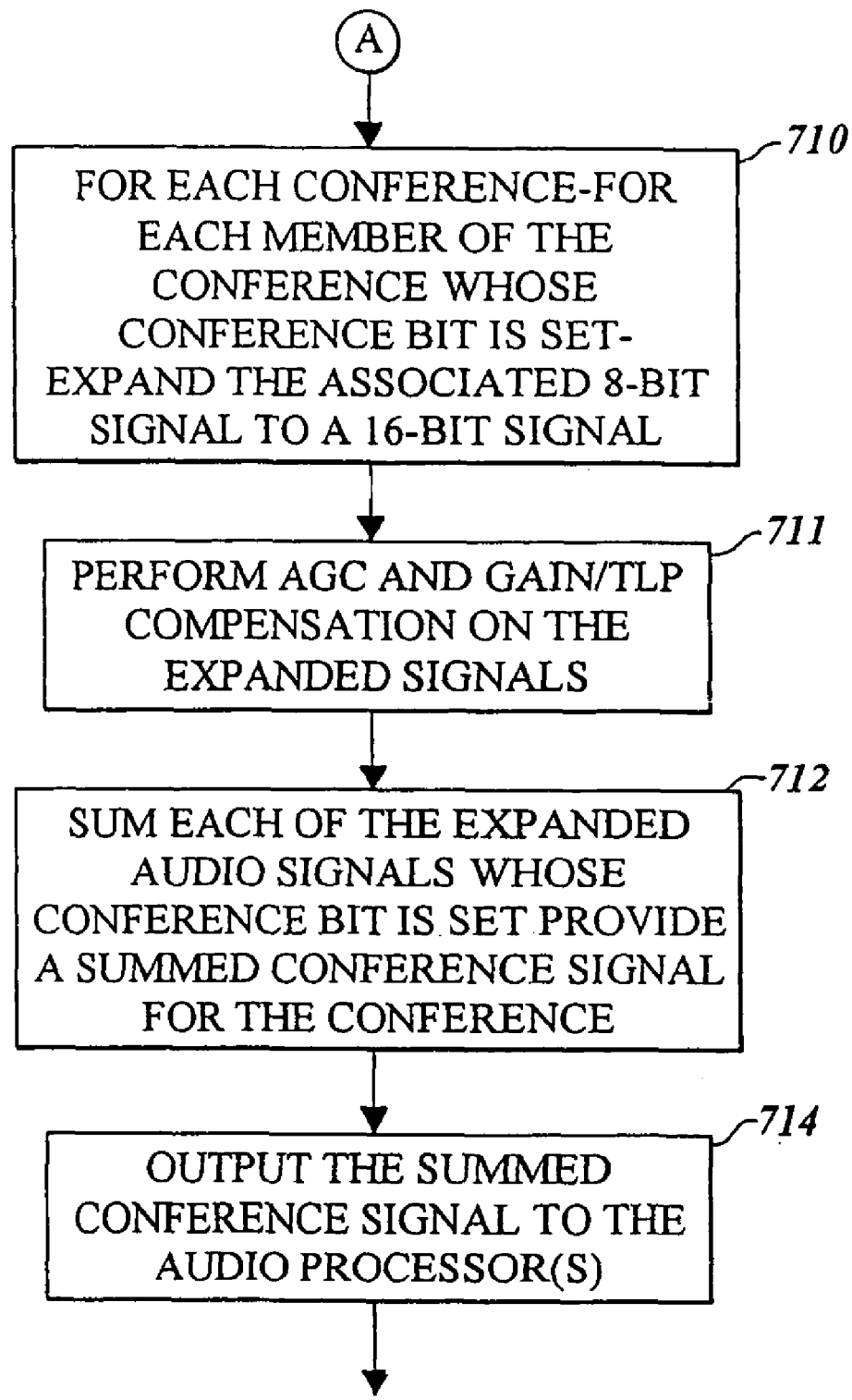

FIGS. 7A-7B collectively provide a flow chart illustrating processing steps 700 performed by the audio conference mixer 90 (see FIG. 4), preferably at least once every 125 microseconds, to create a summed conference signal for each conference. The executable program instructions associated with the processing steps 700 are typically downloaded by the controller/CPU 48 (see FIG. 2) over the system bus 50 (see FIG. 2) to the DSP designated to perform the conference mixer function. The download may occur during initialization or system reconfiguration.

Referring to FIG. 7A, for each of the active/assigned ports of the audio conferencing system, step 702 reads the speech bit and the DTMF detect bit received over the TDM bus 42 (see FIG. 4). Alternatively, the speech bits may be provided over a dedicated serial link that interconnects the audio processor or processors and the conference mixer. Step 704 is then performed to determine whether the speech bit for the port is set (i.e., whether energy that may be speech is detected on that port). If the speech bit is set, then step 706 is performed to see whether the DTMF detect bit for the port is also set. If the DTMF detect bit is clear, then the audio received by the port is speech and the audio does not include DTMF tones. As a result, step 708 sets the conference bit for that port; otherwise, step 709 clears the conference bit associated with the port. Since the audio conferencing platform 26 (see FIG. 1) preferably can support many simultaneous conferences (e.g., 384), the controller/CPU 48 (see FIG. 2) keeps track of the conference that each port is assigned to and provides that information to the DSP performing the audio conference mixer function. Upon the completion of step 708, the conference bit for each port has been updated to indicate the conference participants whose voice should be included in the conference sum.

Referring to FIG. 7B, for each of the conferences, step 710 is performed, if needed, to decompress each of the audio signals associated with conference bits that are set. Step 711 performs AGC and gain/TLP (Test Level Point) compensation on the expanded signals from step 710. Step 712 is then performed to sum each of the compensated audio samples to provide a summed conference signal. Since many conference participants may be speaking at the same time, the system preferably limits the number of conference participants whose voice is summed to create the conference audio. For example, the system may sum the audio signals from a maximum of three speaking conference participants. Step 714 outputs the summed audio signal for the conference to the audio processors, as appropriate. In a preferred embodiment, the summed audio signal for each conference is output to the audio processor(s) over the TDM bus. Since the audio conferencing platform supports a number of simultaneous conferences, steps 710-714 are performed for each of the conferences.

Figure 8:
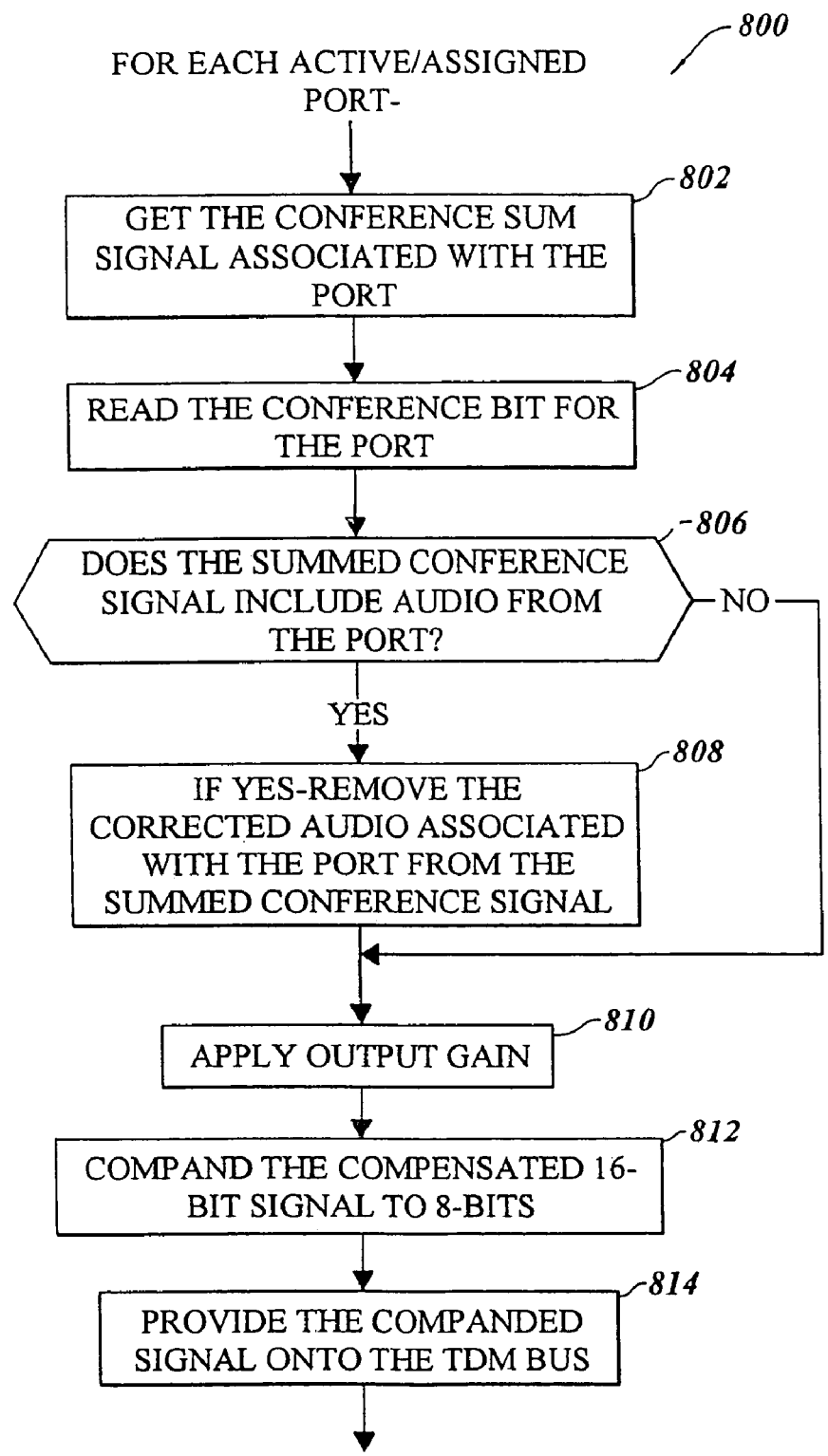
FIG. 8 is a flow chart illustrating the processing of signals to be output to the network interface cards via the TDM bus.

FIG. 8 is a flow chart illustrating the processing steps 800 performed by each audio processor to output audio signals over the TDM bus to conference participants. The executable program instructions associated with these processing steps 800 are typically downloaded to each audio processor by the controller/CPU during system initialization or reconfiguration. These steps 800 are also preferably executed at least once every 125 microseconds.

For each active/assigned port, step 802 retrieves the summed conference signal for the conference that the port is assigned to. Step 804 reads the conference bit associated with the port, and step 806 tests the bit to determine whether audio from the port was used to create the summed conference signal. If it was, then step 808 removes the gain (e.g., AGC and gain/TLP) compensated audio signal associated with the port from the summed audio signal. This step removes the speaker's own voice from the conference audio. If step 806 determines that audio from the port was not used to create the summed conference signal, then step 808 is bypassed. To prepare the signal to be output, step 810 applies a gain, and step 812 compresses the gain corrected signal. Step 814 then outputs the compressed signal onto the TDM bus for routing to the conference participant associated with the port, via the NIC (see FIG. 2).

Preferably, the audio conferencing platform 26 (see FIG. 1) computes conference sums at a central location. This reduces the distributed summing that would otherwise need to be performed to ensure that the ports receive the proper conference audio. In addition, the conference platform is readily expandable by adding additional NICs and/or processor boards. That is, the centralized conference mixer architecture allows the audio conferencing platform to be scaled to the user's requirements.

One of ordinary skill will appreciate that the overall system design is a function of the processing ability of each DSP. For example, if a sufficiently fast DSP is available, then the functions of the audio conference mixer, the audio processor and the DTMF tone detection and the other DSP functions may be performed by a single DSP.

In addition, although the aspect of the dynamic threshold value has been discussed in the context of a system that employs a centralized summing architecture, one of ordinary skill in the art will recognize that dynamic thresholding is certainly not limited to systems with a centralized summing architecture. It is contemplated that all audio conferencing systems, and systems with similar audio capabilities, would enjoy the benefits associated with employing a dynamic threshold value for determining whether a line includes speech.

Although the present invention has been shown and described with respect to several preferred embodiments thereof, various changes, omissions and additions to the form and detail thereof, may be made therein, without departing from the spirit and scope of the invention.

What is claimed is:

1. A method for conferencing, comprising:
   determining whether noise is present on at least one port of a conferencing system;
   determining a dynamic threshold value for the at least one port, if and only if it was determined that noise was present;
   receiving an audio signal over the at least one port;
   comparing a characteristic of the received audio signal to the determined dynamic threshold value; and including the received audio signal in a conference sum audio signal provided to at least some participants of the conference depending on the result of the comparison.

2. The method of claim 1, wherein the received audio signal is included in the conference sum if the characteristic exceeds the dynamic threshold value.

3. The method of claim 2, wherein the characteristic comprises audio signal energy.

4. The method of claim 2, wherein the characteristic comprises audio signal magnitude.

5. The method of claim 1, wherein determining whether noise is present on the at least one port comprises a comparison to a noise threshold.

6. The method of claim 5, wherein the comparison to a noise threshold occurs for a predetermined amount of time.

7. A method for conferencing, comprising:
receiving an audio signal over the at least one port of a conferencing system;
determining whether a DTMF tone is present in the received audio signal;
if a DTMF tone is present in the audio signal, omitting the received audio signal from a conference sum audio signal provided to at least some participants of the conference.

8. The method of claim 7, wherein omitting the received audio comprises assessment of a DTMF detect signal.

9. A method for conferencing, comprising:
determining whether valid speech is present in an audio signal received over at least one port of a conferencing system;
determining whether a DTMF tone is present in the received audio signal;
if valid speech is present and if no DTMF tone is present, including the received audio signal in a conference sum audio signal provided to at least some participants of the conference;
if valid speech is not present or if a DTMF tone is present, omitting the received audio signal from a conference sum audio signal broadcast to at least some participants of the conference.

10. The method of claim 9, wherein determining whether valid speech is present comprises:
determining whether noise is present in the on the at least one port;
determining a dynamic threshold value for the at least one port if and only if it was determined that noise was present; and
comparing a characteristic of the received audio signal to the determined dynamic threshold value.

11. The method of claim 10, wherein the characteristic comprises audio signal energy.

12. The method of claim 10, wherein the characteristic comprises audio signal magnitude.

13. A programmable processor communicatively coupled to a conferencing system, the programmable processor programmed with a program to manage a conference, the program comprising instructions for:
determining whether noise is present on at least one port of a conferencing system;
determining a dynamic threshold value for the at least one port, if and only if it was determined that noise was present;
receiving an audio signal over the at least one port;
comparing a characteristic of the received audio signal to the determined dynamic threshold value; and
including the received audio signal in a conference sum audio signal provided to at least some participants of the conference depending on the result of the comparison.

14. A programmable processor communicatively coupled to a conferencing system, the programmable processor programmed with a program to manage a conference, the program comprising instructions for:
receiving an audio signal over the at least one port of a conferencing system;
determining whether a DTMF tone is present in the received audio signal;
if a DTMF tone is present in the audio signal, omitting the received audio signal from a conference sum audio signal provided to at least some participants of the conference.

15. A programmable processor communicatively coupled to a conferencing system, the programmable processor programmed with a program to manage a conference, the program comprising instructions for:
determining whether valid speech is present in an audio signal received over at least one port of a conferencing system;
determining whether a DTMF tone is present in the received audio signal;
if valid speech is present and if no DTMF tone is present, including the received audio signal in a conference sum audio signal broadcast to at least some participants of the conference;
if valid speech is not present or if a DTMF tone is present, omitting the received audio signal from a conference sum audio signal provided to at least some participants of the conference.

* * * * *

UNITED STATES PATENT AND TRADEMARK OFFICE
CERTIFICATE OF CORRECTION

PATENT NO. : 8,111,820 B2  
APPLICATION NO. : 10/801276  
DATED : February 7, 2012  
INVENTOR(S) : William O'Malley et al.

Page 1 of 1

It is certified that error appears in the above-identified patent and that said Letters Patent is hereby corrected as shown below:

Column 9, line 17, in Claim 7, after "over," delete "the"  
Column 10, line 24, in Claim 14, after "over," delete "the"

Signed and Sealed this  
Eighth Day of May, 2012

David J. Kappos  
*Director of the United States Patent and Trademark Office*